(12) United States Patent
Xia et al.

(10) Patent No.: US 9,710,504 B2
(45) Date of Patent: Jul. 18, 2017

(54) DATA PROCESSING AND WRITING METHOD AND RELATED APPARATUS

(71) Applicant: Huawei Technologies Co., Ltd., Shenzhen (CN)

(72) Inventors: Jingting Xia, Shenzhen (CN); Liang Ke, Shenzhen (CN); Jianjian Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/231,914

(22) Filed: Aug. 9, 2016

(65) Prior Publication Data
US 2016/0350343 A1 Dec. 1, 2016

Related U.S. Application Data

(63) Continuation of application No. PCT/CN2014/071931, filed on Feb. 10, 2014.

(51) Int. Cl.
G06F 17/30 (2006.01)

(52) U.S. Cl.
CPC .. *G06F 17/30315* (2013.01); *G06F 17/30339* (2013.01); *G06F 17/30374* (2013.01)

(58) Field of Classification Search
CPC ......... G06F 17/30315; G06F 17/30339; G06F 17/30374

(Continued)

(56) References Cited

U.S. PATENT DOCUMENTS 5,345,575 A * 9/1994 English ............... G06F 3/0601
360/78.04
5,802,344 A * 9/1998 Menon ................ G06F 3/0607
711/165

(Continued)

FOREIGN PATENT DOCUMENTS

CN 102682108 A 9/2012
CN 103020305 A 4/2013

(Continued)

OTHER PUBLICATIONS

Adabi et al, "The Design and Implementation of Modern Column-Oriented Database Systems", Foundation and Trend in Databases, vol. 5, No. 3 (2012), 83 pages.*
Foreign Communication From a Counterpart Application, PCT Application No. PCT/CN2014/071931, English Translation of International Search Report dated Nov. 15, 2014, 2 pages.

(Continued)

*Primary Examiner* — Rehana Perveen
*Assistant Examiner* — Loc Tran
(74) *Attorney, Agent, or Firm* — Conley Rose, P.C.

(57) ABSTRACT

A data processing method includes acquiring to-be-stored data in a data table in a columnar database; dividing and/or combining the to-be-stored data according to space of an allocated disk cylinder; and storing same-row data of the to-be-stored data in a same disk cylinder, and in the disk cylinder, successively storing data in each section of columns. Correspondingly, the present disclosure further discloses a data writing method and a related apparatus and device. A technical problem in the prior art that a write speed is slow when a columnar database is running is resolved using the present disclosure, which greatly improves write efficiency of a columnar database. In addition, direct parallel reading or writing may also be implemented by means of hardware marking.

26 Claims, 10 Drawing Sheets

(58) Field of Classification Search
USPC .......................................... 707/737, 740, 741
See application file for complete search history.

(56) References Cited

U.S. PATENT DOCUMENTS

| | | | |
|---|---|---|---|
| 7,730,106 | B2 | 6/2010 | Browning |
| 2003/0140139 | A1* | 7/2003 | Marejka ............... H04L 43/14 709/224 |
| 2008/0168069 | A1* | 7/2008 | Chang .................. G06F 3/0613 |
| 2009/0254516 | A1 | 10/2009 | Meiyyappan et al. |
| 2012/0310874 | A1 | 12/2012 | Dantressangle et al. |
| 2014/0244628 | A1 | 8/2014 | Yoon et al. |

FOREIGN PATENT DOCUMENTS

| | | |
|---|---|---|
| CN | 103177055 A | 6/2013 |
| CN | 103400587 A | 11/2013 |
| CN | 103548024 A | 1/2014 |

OTHER PUBLICATIONS

Foreign Communication From a Counterpart Application, PCT Application No. PCT/CN2014/071931, English Translation of Written Opinion dated Nov. 15, 2014, 7 pages.

Foreign Communication From a Counterpart Application, PCT Application No. PCT/CN2014/071931, International Search Report dated Nov. 15, 2014, 4 pages.

Foreign Communication From a Counterpart Application, PCT Application No. PCT/CN2014/071931, Written Opinion dated Nov. 15, 2014, 4 pages.

Abadi, D., et al., "The Design and Implementation of Modern Column-Oriented Database System," XP055104257, vol. 5, No. 3, 2012, pp. 197-280.

Klonatos, I., et al., "Combining MapReduce with Parallel DBMS Techniques for Large-Scale Data Analytics," XP055335486, EDIC Research Proposal, Sep. 3, 2012, 8 pages.

Foreign Communication From a Counterpart Application, European Application No. 14881915.4, Extended European Search Report dated Jan. 25, 2017, 12 pages.

* cited by examiner

DATA PROCESSING AND WRITING METHOD AND RELATED APPARATUS

CROSS-REFERENCE TO RELATED APPLICATIONS

This application is a continuation of International Application No. PCT/CN2014/071931, filed on Feb. 10, 2014, which is hereby incorporated by reference in its entirety.

TECHNICAL FIELD

The present disclosure relates to the computer field, and in particular, to a data processing method, a data writing method, and a related apparatus.

BACKGROUND

A columnar database is a database having an extremely fast query speed. By dividing one table in a relational database into multiple columns and storing them separately, the columnar database allows an entire column of data to be read at one time during a database query. The columnar database has an advantage of reducing consumption of a database projection operation. During a query, it is not necessary to read data of an entire table, but only necessary to read a corresponding column, which dramatically reduces a read input/output (IO) amount. However, due to a storage manner of a columnar database, a write operation of the columnar database is slower than that of a traditional row-oriented database.

An existing columnar technology is to obtain columns in a relational database by means of division and store them separately. In this case, all columns need to be modified during row writing. However, because the columns are stored after division, addressing needs be performed multiple times during row writing on a hard disk, and write efficiency is equivalent to that of random write. A speed of the random write is far slower than that of sequential write, and therefore, write efficiency of the columnar database is extremely low.

SUMMARY

In embodiments of the present disclosure a data processing method, a data writing method, and a related apparatus are provided, which resolves a technical problem in the prior art that a write speed is slow when a columnar database is running, and greatly improves write efficiency of a columnar database.

According to a first aspect, an embodiment of the present disclosure provides a data processing method, including acquiring to-be-stored data in a data table in a columnar database; and dividing and/or combining the to-be-stored data according to space of an allocated disk cylinder; and storing same-row data of the to-be-stored data in a same disk cylinder, and in the disk cylinder, successively storing data in each section of columns.

With reference to the first aspect, in a first possible implementation manner, the dividing and/or combining the to-be-stored data according to space of an allocated disk cylinder includes determining, according to a set storage column width and a column attribute of the to-be-stored data, continuous space of a disk cylinder that needs to be allocated; dividing and/or combining all columns of the to-be-stored data according to the storage column width to convert all the columns into at least one standard column, and recording conversion information, where a column width of the standard column is the storage column width; and dividing, according to the continuous space of the allocated disk cylinder and a set section storage size, each standard column obtained after conversion into at least one section, where a size of each section obtained by means of division is the set section storage size.

With reference to the first possible implementation manner of the first aspect, in a second possible implementation manner, the determining, according to a set storage column width and a column attribute of the to-be-stored data, continuous space of a disk cylinder that needs to be allocated includes calculating a quantity of required standard columns according to the set storage column width and the column attribute of the to-be-stored data; and determining, according to the calculated quantity of required standard columns and the set section storage size, the continuous space of the disk cylinder that needs to be allocated.

With reference to the first possible implementation manner of the first aspect or the second possible implementation manner of the first aspect, in a third possible implementation manner, the storing same-row data of the to-be-stored data in a same disk cylinder, and in the disk cylinder, successively storing data in each section of columns includes successively storing, according to a column sequence of all the standard columns obtained after conversion, one section of each standard column in the allocated disk cylinder, where data of each section is successively stored in sequence, and all data sections in a same disk cylinder have a same data row quantity.

With reference to the first possible implementation manner of the first aspect or the second possible implementation manner of the first aspect, in a fourth possible implementation manner, when a local device includes at least two platters, the storing same-row data of the to-be-stored data in a same disk cylinder, and in the disk cylinder, successively storing data in each section of columns includes marking, by means of hardware, start positions of different platters that constitute a same physical cylinder, where the start positions of all the platters are aligned with each other on the same physical cylinder; and simultaneously storing, starting from the start positions, sections of all the standard columns obtained after conversion in all the platters of the same physical cylinder, where data of each section is successively stored in sequence, and all data sections have a same data row quantity.

With reference to the third possible implementation manner of the first aspect, in a fifth possible implementation manner, when each standard column is divided into at least two sections, the successively storing, according to a column sequence of all the standard columns obtained after conversion, one section of each standard column in the allocated disk cylinder includes, according to the column sequence of all the standard columns obtained after conversion, successively storing one section of each standard column in the allocated disk cylinder, and then successively storing a next section of each standard column in the allocated disk cylinder.

With reference to the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner, when the local device is a raw device, the disk cylinder is at least one continuous logical cylinder; or when the local device includes at least two platters, the disk cylinder is a physical cylinder constituted by the at least two platters.

With reference to the first possible implementation manner of the first aspect, the second possible implementation manner of the first aspect, the third possible implementation manner of the first aspect, the fourth possible implementation manner of the first aspect, or the fifth possible implementation manner of the first aspect, in a seventh possible implementation manner, the method further includes generating a standard-column management table, used to store set storage column width information, section information corresponding to each standard column, and start position information of each section.

With reference to the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, or the seventh possible implementation manner of the first aspect, in an eighth possible implementation manner, the method further includes acquiring section start information and conversion information that are corresponding to to-be-read data; and reading the corresponding data according to the section start information and using the conversion information.

With reference to the eighth possible implementation manner of the first aspect, in a ninth possible implementation manner, the acquiring section start information and conversion information that are corresponding to to-be-read data includes searching a database column information table or a disk management information table for standard-column information and the conversion information that are corresponding to the to-be-read data; and acquiring all section start information corresponding to a found standard column from the standard-column management table.

According to a second aspect, an embodiment of the present disclosure provides a data writing method, including determining a row number of row data to be written into stored data, where the stored data is stored using the data processing method in the first possible implementation manner of the first aspect; searching, according to the row number, for a section location that is in the stored data and to which the to-be-written row data belongs, and editing the to-be-written row data according to a set storage column width, so as to conform to a format of the stored data; and correspondingly writing, in a same disk cylinder, the row data into a section of each standard column according to the section location.

With reference to the second aspect, in a first possible implementation manner, the searching, according to the row number, for a section location that is in the stored data and to which the to-be-written row data belongs includes searching, according to the row number, a database column information table or a disk management information table for a section that is in the stored data and to which the to-be-written row data belongs; and acquiring start information corresponding to a found section from a standard-column management table.

With reference to the second aspect, in a second possible implementation manner, when a local device includes at least two platters, the searching, according to the row number, for a section location that is in the stored data and to which the to-be-written row data belongs includes acquiring start positions, that are marked by means of hardware, of different platters that constitute a same physical cylinder, where the start positions of all the platters are aligned with each other on the same physical cylinder; and searching, according to the start positions and the row number, for a start position of a section that is in the stored data and to which the to-be-written row data belongs.

According to a third aspect, an embodiment of the present disclosure provides a data processing apparatus, including a data acquiring module configured to acquire to-be-stored data in a data table in a columnar database; and an editing and storing module configured to divide and/or combine the to-be-stored data according to space of an allocated disk cylinder; and store same-row data of the to-be-stored data in a same disk cylinder, and in the disk cylinder, successively store data in each section of columns.

With reference to the third aspect, in a first possible implementation manner, the editing and storing module includes a space determining unit configured to determine, according to a set storage column width and a column attribute of the to-be-stored data, continuous space of a disk cylinder that needs to be allocated; a conversion unit configured to divide and/or combine all columns of the to-be-stored data according to the storage column width to convert all the columns into at least one standard column, and record conversion information, where a column width of the standard column is the storage column width; and a section dividing unit configured to divide, according to the continuous space of the allocated disk cylinder and a set section storage size, each standard column obtained after conversion into at least one section, where a size of each section obtained by means of division is the set section storage size.

With reference to the first possible implementation manner of the third aspect, in a second possible implementation manner, the space determining unit includes a first calculation unit configured to calculate a quantity of required standard columns according to the set storage column width and the column attribute of the to-be-stored data; and a first determining unit configured to determine, according to the calculated quantity of required standard columns and the set section storage size, the continuous space of the disk cylinder that needs to be allocated.

With reference to the first possible implementation manner of the third aspect or the second possible implementation manner of the third aspect, in a third possible implementation manner, the editing and storing module further includes a first section storing unit configured to successively store, according to a column sequence of all the standard columns obtained after conversion, one section of each standard column in the allocated disk cylinder, where data of each section is successively stored in sequence, and all data sections in a same disk cylinder have a same data row quantity.

With reference to the first possible implementation manner of the third aspect or the second possible implementation manner of the third aspect, in a fourth possible implementation manner, when the data processing apparatus includes at least two platters, the editing and storing module further includes a hardware marking unit configured to mark, by means of hardware, start positions of different platters that constitute a same physical cylinder, where the start positions of all the platters are aligned with each other on the same physical cylinder; and a second section storing unit configured to simultaneously store, starting from the start positions, sections of all the standard columns obtained after conversion in all the platters of the same physical cylinder, where data of each section is successively stored in sequence, and all data sections have a same data row quantity.

With reference to the third possible implementation manner of the third aspect, in a fifth possible implementation manner, when each standard column is divided into at least two sections, the first section storing unit is configured to, according to the column sequence of all the standard columns obtained after conversion, successively store one section of each standard column in the allocated disk cylinder, then successively store a next section of each standard column in the allocated disk cylinder, where data of each section is successively stored in sequence, and all data sections of a same disk cylinder have a same data row quantity.

With reference to the third aspect, the first possible implementation manner of the third aspect, the second possible implementation manner of the third aspect, the third possible implementation manner of the third aspect, the fourth possible implementation manner of the third aspect, or the fifth possible implementation manner of the third aspect, in a sixth possible implementation manner, when the data processing apparatus is a raw device, the disk cylinder is at least one continuous logical cylinder; or when the data processing apparatus includes at least two platters, the disk cylinder is a physical cylinder constituted by the at least two platters.

With reference to the first possible implementation manner of the third aspect, the second possible implementation manner of the third aspect, the third possible implementation manner of the third aspect, the fourth possible implementation manner of the third aspect, or the fifth possible implementation manner of the third aspect, in a seventh possible implementation manner, the data processing apparatus further includes a standard-column management table generating module configured to generate a standard-column management table, used to store set storage column width information, section information corresponding to each standard column, and start position information of each section.

With reference to the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, or the seventh possible implementation manner of the third aspect, in an eighth possible implementation manner, the data processing apparatus further includes a start information acquiring module configured to acquire section start information and conversion information that are corresponding to to-be-read data; and a data reading module configured to read the corresponding data according to the section start information and using the conversion information.

With reference to the eighth possible implementation manner of the third aspect, in a ninth possible implementation manner, the start information acquiring module includes a first searching unit configured to search a database column information table or a disk management information table for standard-column information and the conversion information that are corresponding to the to-be-read data; and a first acquiring unit configured to acquire all section start information corresponding to a found standard column from the standard-column management table.

According to a fourth aspect, an embodiment of the present disclosure provides a data writing apparatus, including a row number determining module configured to determine a row number of row data to be written into stored data, where the stored data is stored using the data processing apparatus in the first possible implementation manner of the foregoing third aspect; a section location searching module configured to search, according to the row number, for a section location that is in the stored data and to which the to-be-written row data belongs; a row data editing module configured to edit the to-be-written row data according to a set storage column width, so as to conform to a format of the stored data; and a row writing module configured to correspondingly write, in a same disk cylinder, the row data into a section of each standard column according to the section location.

With reference to the fourth aspect, in a first possible implementation manner, the section location searching module includes a second searching unit configured to search, according to the row number, a database column information table or a disk management information table for a section that is in the stored data and to which the to-be-written row data belongs; and a third searching unit configured to acquire start information corresponding to a found section from a standard-column management table.

With reference to the fourth aspect, in a second possible implementation manner, when the data writing apparatus includes at least two platters, the section location searching module includes a second acquiring unit configured to acquire start positions, that are marked by means of hardware, of different platters that constitute a same physical cylinder, where the start positions of all the platters are aligned with each other on the same physical cylinder; and a fourth searching unit configured to search, according to the start positions and the row number, for a start position of a section that is in the stored data and to which the to-be-written row data belongs.

According to a fifth aspect, an embodiment of the present disclosure provides an electronic device, including an input apparatus, an output apparatus, a memory, and a processor, where the processor executes the following steps: acquire to-be-stored data in a data table in a columnar database; divide and/or combine the to-be-stored data according to space of an allocated disk cylinder; and store same-row data of the to-be-stored data in a same disk cylinder, and in the disk cylinder, successively store data in each section of columns.

With reference to the fifth aspect, in a first possible implementation manner, that the processor divides and/or combines the to-be-stored data according to the space of the allocated disk cylinder includes determining, according to a set storage column width and a column attribute of the to-be-stored data, continuous space of a disk cylinder that needs to be allocated; dividing and/or combining all columns of the to-be-stored data according to the storage column width to convert all the columns into at least one standard column, and recording conversion information, where a column width of the standard column is the storage column width; and dividing, according to the continuous space of the allocated disk cylinder and a set section storage size, each standard column obtained after conversion into at least one section, where a size of each section obtained by means of division is the set section storage size.

With reference to the first possible implementation manner of the fifth aspect, in a second possible implementation manner, that the processor determines, according to the set storage column width and the column attribute of the to-be-stored data, the continuous space of the disk cylinder that needs to be allocated includes calculating a quantity of required standard columns according to the set storage column width and the column attribute of the to-be-stored data; and determining, according to the calculated quantity of required standard columns and the set section storage size, the continuous space of the disk cylinder that needs to be allocated.

With reference to the first possible implementation manner of the fifth aspect or the second possible implementation manner of the fifth aspect, in a third possible implementation manner, that the processor stores the same-row data of the to-be-stored data in the same disk cylinder, and in the disk cylinder, successively stores the data in each section of columns includes successively storing, according to a column sequence of all the standard columns obtained after conversion, one section of each standard column in the allocated disk cylinder, where data of each section is successively stored in sequence, and all data sections in a same disk cylinder have a same data row quantity.

With reference to the first possible implementation manner of the fifth aspect or the second possible implementation manner of the fifth aspect, in a fourth possible implementation manner, when the electronic device includes at least two platters, that the processor stores the same-row data of the to-be-stored data in the same disk cylinder, and in the disk cylinder, successively stores the data in each section of columns includes marking, by means of hardware, start positions of different platters that constitute a same physical cylinder, where the start positions of all the platters are aligned with each other on the same physical cylinder; and simultaneously storing, starting from the start positions, sections of all the standard columns obtained after conversion in all the platters of the same physical cylinder, where data of each section is successively stored in sequence, and all data sections have a same data row quantity.

With reference to the third possible implementation manner of the fifth aspect, in a fifth possible implementation manner, when each standard column is divided into at least two sections, that the processor successively stores, according to the column sequence of all the standard columns obtained after conversion, one section of each standard column in the allocated disk cylinder includes, according to the column sequence of all the standard columns obtained after conversion, successively storing one section of each standard column in the allocated disk cylinder, and then successively storing a next section of each standard column in the allocated disk cylinder.

With reference to the fifth aspect, the first possible implementation manner of the fifth aspect, the second possible implementation manner of the fifth aspect, the third possible implementation manner of the fifth aspect, the fourth possible implementation manner of the fifth aspect, or the fifth possible implementation manner of the fifth aspect, in a sixth possible implementation manner, when the electronic device is a raw device, the disk cylinder is at least one continuous logical cylinder; or when the electronic device includes at least two platters, the disk cylinder is a physical cylinder constituted by the at least two platters.

With reference to the first possible implementation manner of the fifth aspect, the second possible implementation manner of the fifth aspect, the third possible implementation manner of the fifth aspect, the fourth possible implementation manner of the fifth aspect, or the fifth possible implementation manner of the fifth aspect, in a seventh possible implementation manner, the processor further executes generating a standard-column management table, used to store set storage column width information, section information corresponding to each standard column, and start position information of each section.

With reference to the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect, the sixth possible implementation manner of the fifth aspect, or the seventh possible implementation manner of the fifth aspect, in an eighth possible implementation manner, the processor further executes the following steps: acquire section start information and conversion information that are corresponding to to-be-read data; and read the corresponding data according to the section start information and using the conversion information.

With reference to the eighth possible implementation manner of the fifth aspect, in a ninth possible implementation manner, that the processor acquires the section start information and the conversion information that are corresponding to the to-be-read data includes searching a database column information table or a disk management information table for standard-column information and the conversion information that are corresponding to the to-be-read data; and acquiring all section start information corresponding to a found standard column from the standard-column management table.

According to a sixth aspect, an embodiment of the present disclosure provides an electronic device, including an input apparatus, an output apparatus, a memory, and a processor, where the processor executes the following steps: determine a row number of row data to be written into stored data, where the stored data is stored using the data processing method in the first possible implementation manner of the first aspect; search, according to the row number, for a section location that is in the stored data and to which the to-be-written row data belongs, and edit the to-be-written row data according to a set storage column width, so as to conform to a format of the stored data; and correspondingly write, in a same disk cylinder, the row data into a section of each standard column according to the section location.

With reference to the sixth aspect, in a first possible implementation manner, that the processor searches, according to the row number, for the section location that is in the stored data and to which the to-be-written row data belongs includes searching, according to the row number, a database column information table or a disk management information table for a section that is in the stored data and to which the to-be-written row data belongs; and acquiring start information corresponding to a found section from a standard-column management table.

With reference to the sixth aspect, in a second possible implementation manner, when the electronic device includes at least two platters, that the processor searches, according to the row number, for the section location that is in the stored data and to which the to-be-written row data belongs includes acquiring start positions, that are marked by means of hardware, of different platters that constitute a same physical cylinder, where the start positions of all the platters are aligned with each other on the same physical cylinder; and searching, according to the start positions and the row number, for a start position of a section that is in the stored data and to which the to-be-written row data belongs.

During implementation of the embodiments of the present disclosure, same-row data of the to-be-stored data is stored in a same disk cylinder, and in the disk cylinder, data in each section of columns is successively stored. A magnetic disk can complete row writing by rotating for addressing only once, and write performance is close to that of sequential write, which resolves the technical problem of a slow write speed during columnar database running in the prior art, and greatly improves write efficiency of a columnar database. In addition, hardware marking may further be used, so that standard columns are aligned with each other among platters. Then, when data in a same row but different columns needs to be read or written, parallel reading or writing may be directly performed because all heads are aligned with each other in physical locations. In addition, data in each column still remains continuous on a same platter, and efficiency in reading or writing a column of data is still equivalent to that of sequential read.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
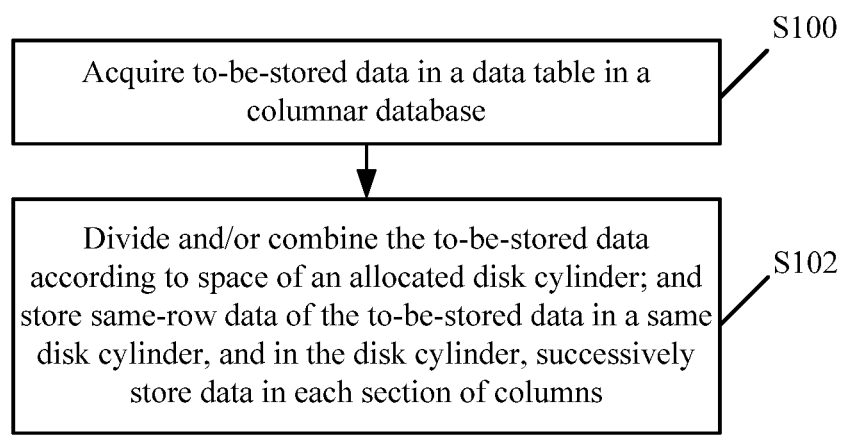
FIG. 1 is a schematic flowchart of a first embodiment of a data processing method according to the present disclosure.

Referring to FIG. 1, FIG. 1 is a schematic flowchart of a first embodiment of a data processing method according to the present disclosure, and the method includes the following steps.

Step S100: Acquire to-be-stored data in a data table in a columnar database.

Step S102: Divide and/or combine the to-be-stored data according to space of an allocated disk cylinder; and store same-row data of the to-be-stored data in a same disk cylinder, and in the disk cylinder, successively store data in each section of columns.

In one embodiment, to-be-stored data of a same data table is acquired, and same-row data of the same data table is stored in a same disk cylinder by dividing and/or combining the to-be-stored data. Then, when it is necessary to perform row writing or row reading subsequently, data row writing or row reading can be completed by rotating a magnetic disk only one round, which greatly improves write efficiency of a columnar database. In addition, in the disk cylinder, the data in each section of columns is successively stored; therefore, an original advantage of column store, that is, a column reading speed is not affected.

Figure 2:
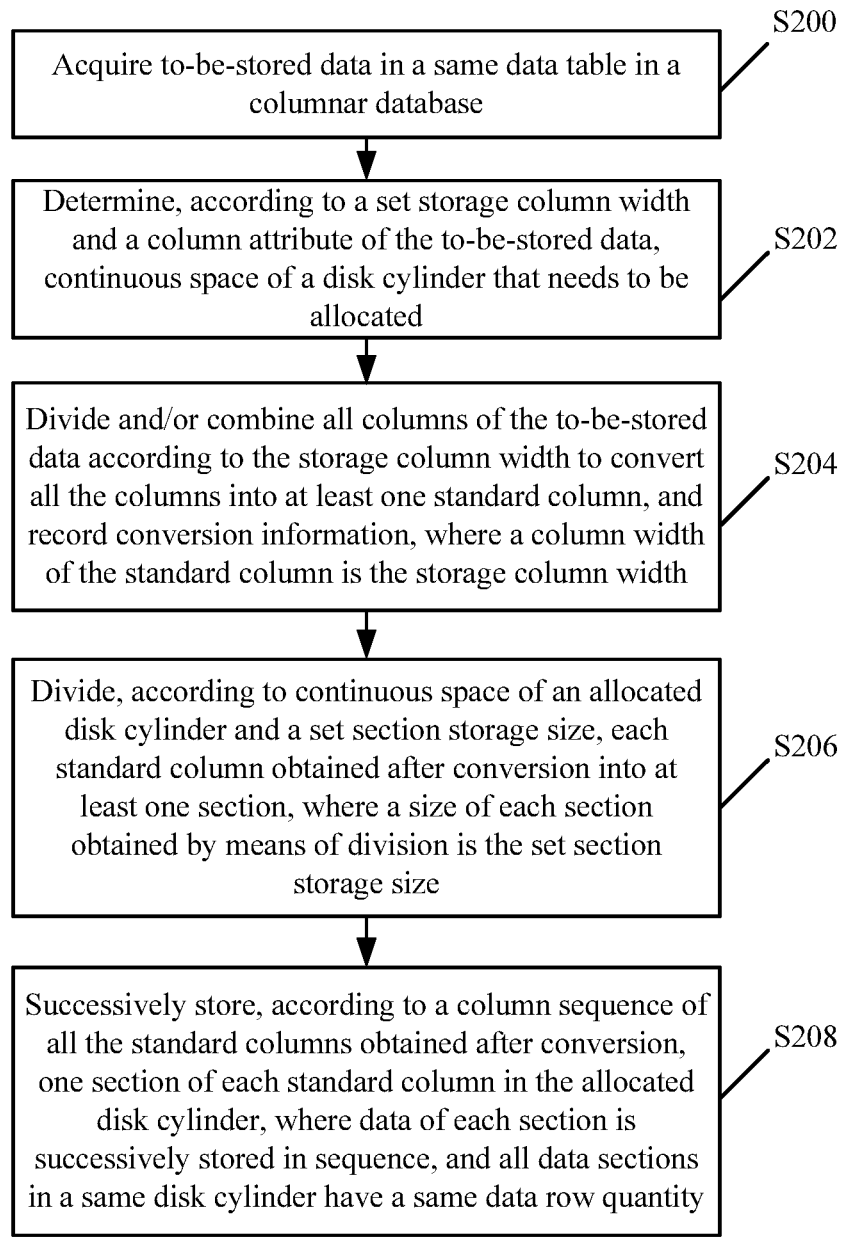
FIG. 2 is a schematic flowchart of a second embodiment of a data processing method according to the present disclosure.

Further, as shown in a schematic flowchart, shown in FIG. 2, of a second embodiment of a data processing method according to the present disclosure, an implementation manner of the present disclosure is described in detail and includes the following steps.

Step S200: Acquire to-be-stored data in a same data table in a columnar database.

Step S202: Determine, according to a set storage column width and a column attribute of the to-be-stored data, continuous space of a disk cylinder that needs to be allocated.

The column attribute includes width information of each column, and a quantity of required standard columns may be calculated according to the set storage column width and the column attribute of the to-be-stored data; then, continuous space of a disk cylinder that needs to be allocated once is determined according to the calculated quantity of required standard columns and a set section storage size.

Further, a user may set the storage column width and the section storage size according to needs, where the storage column width may be considered as a standard column width and is used to divide and/or combine the to-be-stored data according to the standard column width; the section storage size may be considered as a standard-column section size and is used to divide a standard column according to the standard-column section size to obtain at least one section by means of division.

It is assumed that this embodiment of the present disclosure is based on a file system, a database table is stored in a magnetic disk in a file form, and a size of a logical cylinder, which is applied for, from the file system for allocation each time is continuous space of a fixed size (about 7.8 megabytes, that is, 7.8 MB). Then, how many standard columns are needed may be first calculated according to the set storage column width and the column attribute of the to-be-stored data. Assuming that the set storage column width (that is, the standard column width) is 1 Byte, and width of all columns of the to-be-stored data is 7 Bytes in total, it may be calculated that seven standard columns are needed. Further, assuming that the set section storage size (that is, the standard-column section) is 1 MB, a data row quantity in each section is 1 million rows; assuming that a row quantity of the to-be-stored data is 10 million rows, each standard column needs to be divided into 10 sections; finally, it is determined that continuous space of sizes of 10 logical cylinders needs to be allocated. It should be noted that when multiple logical cylinders are allocated based on the file system, space of each logical cylinder is continuous, but the logical cylinders may be continuous or may not be continuous; preferably, there is continuous space between the multiple logical cylinders.

Step S204: Divide and/or combine all columns of the to-be-stored data according to the storage column width to convert all the columns into at least one standard column, and record conversion information, where a column width of the standard column is the storage column width.

Figure 3:
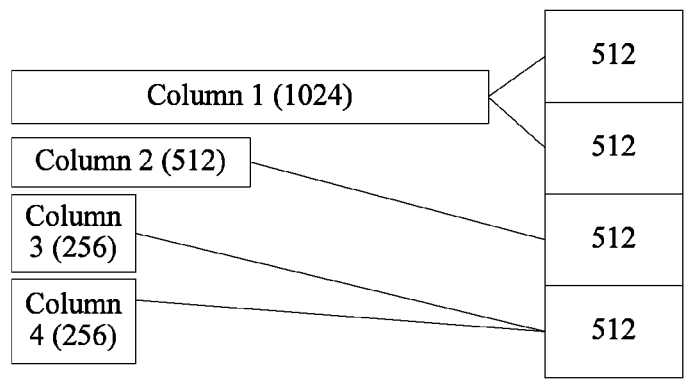
FIG. 3 is a schematic principle diagram of standard-column dividing and/or combining according to an embodiment of the present disclosure.

In a practical database application, actual width of different columns is different; therefore, all the columns of the to-be-stored data are divided and/or combined by setting the storage column width (that is, the standard column width) in the present disclosure, so that data stored at an underlying layer can keep consistent in width. It is assumed that the set standard column width is 512 Bytes, as shown in a schematic principle diagram, shown in FIG. 3, of standard-column dividing and/or combining according to an embodiment of the present disclosure, where width of column 1 is 1024 Bytes, width of column 2 is 512 Bytes, width of column 3 is 256 Bytes, and width of column 4 is 256 Bytes. Then, column 1 may be divided into two standard columns of 512 Bytes, column 2 is not divided, and column 3 and column 4 are combined into one standard column, so that each piece of data keeps consistent in width, and conversion information is recorded (that is, a mask is recorded for use in subsequent data reading).

Step S206: Divide, according to the continuous space of the allocated disk cylinder and a set section storage size, each standard column obtained after conversion into at least one section, where a size of each section obtained by means of division is the set section storage size.

The description in step S202 is used as an example. Based on the file system, it is assumed that each standard column obtained after conversion is divided into 10 sections according to the continuous space of the allocated disk cylinder and the set section storage size, and a size of each section obtained by means of division is the set section storage size 1 MB, which can ensure that each piece of data section has a same row quantity.

Step S208: Successively store, according to a column sequence of all the standard columns obtained after conversion, one section of each standard column in the allocated disk cylinder, where data of each section is successively stored in sequence, and all data sections in a same disk cylinder have a same data row quantity.

When each standard column is divided into at least two sections according to the column sequence of all the standard columns obtained after conversion, one section of each standard column is successively stored in the allocated disk cylinder, and then a next section of each standard column is successively stored in the allocated disk cylinder.

Similarly, the description in step S202 is used as an example. Based on the file system, section 1 of standard column 1, section 1 of standard column 2, section 1 of standard column 3, section 1 of standard column 4, section 1 of standard column 5, section 1 of standard column 6, and section 1 of standard column 7 are successively stored in the first allocated logical cylinder; section 2 of standard column 1, section 2 of standard column 2, section 2 of standard column 3, section 2 of standard column 4, section 2 of standard column 5, section 2 of standard column 6, and section 2 of standard column 7 are successively stored in the second allocated logical cylinder; and by analogy, until section 10 of standard column 1, section 10 of standard column 2, section 10 of standard column 3, section 10 of standard column 4, section 10 of standard column 5, section 10 of standard column 6, and section 10 of standard column 7 are successively stored in the tenth allocated logical cylinder. That is, the first 7 MB of one logical cylinder is sections of standard columns, and the remaining about 0.8 MB is used to record other information (such as deletion tag information). In addition, data of each section is successively stored in sequence, that is, it is ensured that data in a section of each standard column in to-be-stored data is successively stored. Therefore, when data in a column is being read subsequently, the data may be successively read once.

Figure 4:
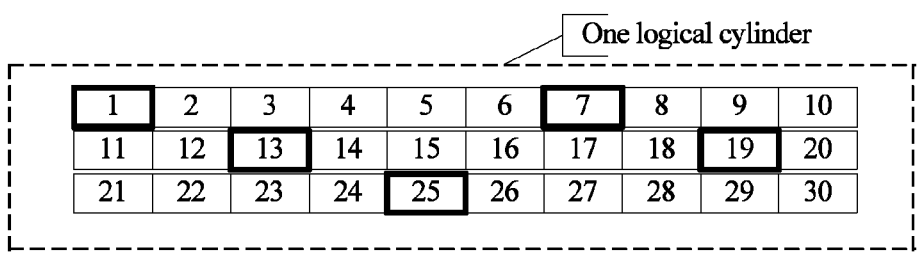
FIG. 4 is a schematic principle diagram of a data processing method according to the present disclosure.
Figure 4:
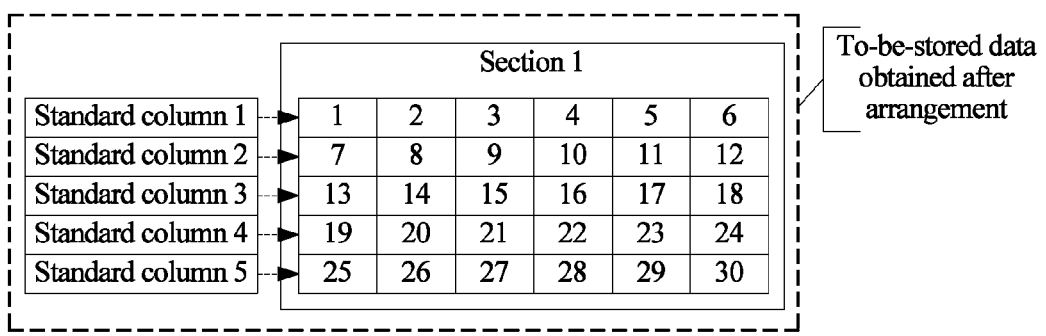

Still further, with reference to a schematic principle diagram, shown in FIG. 4, of a data processing method according to the present disclosure, a specific implementation manner of this embodiment of the present disclosure is illustrated.

It is assumed that an allocated logical cylinder starts at No. 1 disk block and ends at No. 30 disk block. To-be-stored data obtained by means of arrangement in step S202 to step S206 includes standard column 1 to standard column 5. FIG. 4 shows data in sections 1 of standard column 1 to standard column 5, and width of all grids of data in sections 1 is consistent. In FIG. 4, it is completed that same-row data of the to-be-stored data is stored in a same disk cylinder, and in the disk cylinder, data in each section of columns is successively stored. For example, the first-row data of all standard columns is respectively stored in disk blocks 1, 7, 13, 19, and 25; or, the third-row data of all standard columns is respectively stored in disk blocks 3, 9, 15, 21, and 27. Then, if the first-row data of a data table needs to be read subsequently, all data in the first row of the table can be acquired by rotating a magnetic disk only one round. In addition, data in a section of each standard column is successively stored (for example, data in section 1 of standard column 1 is successively stored in disk blocks 1 to 6). Then, if data in a standard column needs to be read subsequently, it can be completed by performing sequential reading once.

It may be understood that when a local device is a raw device, the disk cylinder in this embodiment of the present disclosure is at least one continuous logical cylinder. The raw device means that the current device does not have a file system, and a hard disk block may be directly read. That is, a system may directly acquire and save a starting block number of each logical cylinder in a head of a magnetic disk;

in addition, a logical cylinder allocated to a database each time is one or more continuous logical cylinders.

Figure 5:
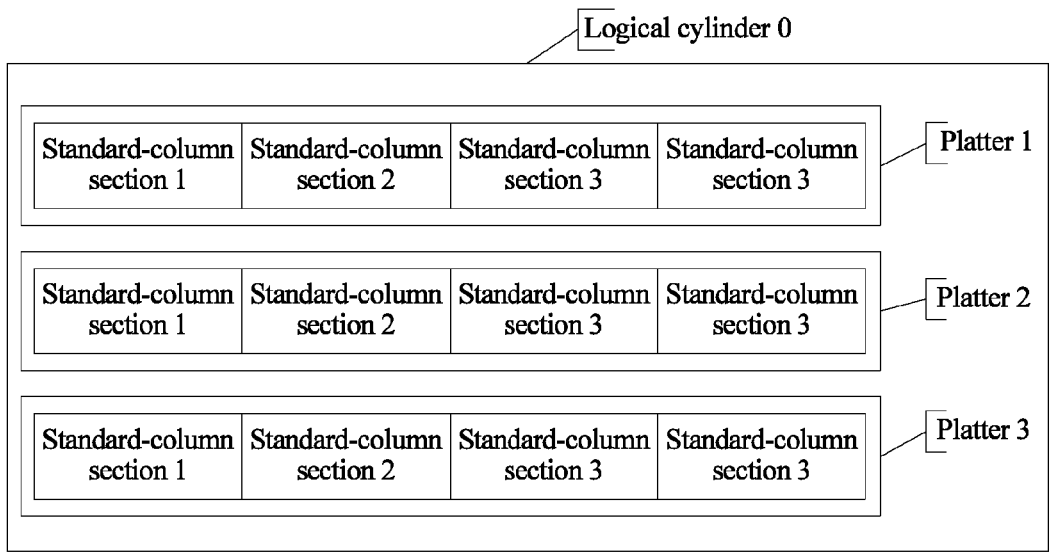
FIG. 5 is a schematic principle diagram of a data processing method based on a multi-platter system according to an embodiment of the present disclosure.

It may be still understood that when a local device includes at least two platters, the disk cylinder in this embodiment of the present disclosure is a physical cylinder constituted by the at least two platters, as shown in a schematic principle diagram, shown in FIG. 5, of a data processing method based on a multi-platter system according to an embodiment of the present disclosure. For example, in a same physical cylinder (cylinder 0), for different platters (platter 1, platter 2, and platter 3), to-be-stored same-row data is aligned vertically; however, on a same platter, a same column of data still remains continuous, so that a database can perform parallel reading/writing on different columns in a same row in the database.

When the local device includes at least two platters, step S208 may include marking, by means of hardware, start positions of different platters that constitute a same physical cylinder, where the start positions of all the platters are aligned with each other on the same physical cylinder; and simultaneously storing, starting from the start positions, sections of all the standard columns obtained after conversion in all the platters of the same physical cylinder, where data of each section is successively stored in sequence, and all data sections have a same data row quantity. The marking, by means of hardware, start positions of different platters that constitute a same physical cylinder may include making a start sector of the physical cylinder corresponding to a logical sector number, and calculating a quantity of offset sectors, of each platter, at an alignment position on the same physical cylinder, or directly marking a start position of each platter on each physical cylinder.

Still further, this embodiment of the present disclosure may further include generating a standard-column management table, used to store set storage column width information, section information corresponding to each standard column, and start position information of each section.

The section information corresponding to each standard column includes the recorded conversion information (that is, mask information) in the foregoing embodiment. Subsequently, it may be found, according to information stored in the standard-column management table, that data that needs to be read is in which section of which standard column, and then, the data is read starting from a start position of a found section; or, subsequently, it may also be found, according to information stored in the standard-column management table, that data that needs to be written is in which section of which standard column, and then, an offset location for writing is calculated using start position information of a found section, to perform data writing.

Figure 6:
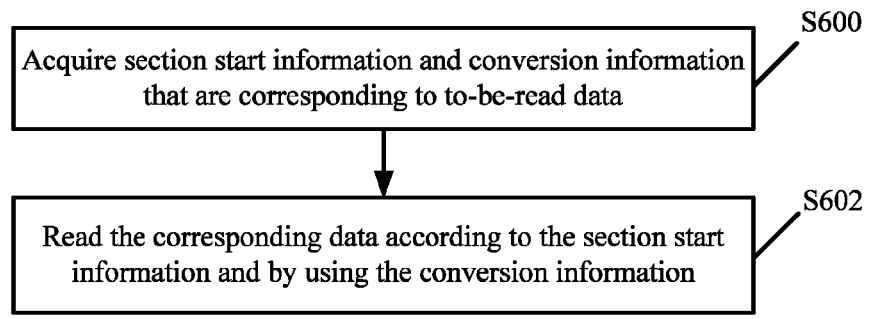
FIG. 6 is a schematic flowchart of a data reading method according to an embodiment of the present disclosure.

To better implement the foregoing solutions of this embodiment of the present disclosure, with reference to a schematic flowchart, shown in FIG. 6, of a data reading method according to an embodiment of the present disclosure, the following describes an implementation manner of the data reading method corresponding to the foregoing data processing method, including the following steps.

Step S600: Acquire section start information and conversion information that are corresponding to to-be-read data.

Step S602: Read the corresponding data according to the section start information and using the conversion information.

The to-be-read data is stored using the embodiment of the foregoing data processing method. A database column information table or a disk management information table is searched for standard-column information and the conversion information that are corresponding to the to-be-read data, and then, all section start information corresponding to a found standard column is acquired from the standard-column management table.

When the local device is a file system, the local device may search, using the database column information table, for standard-column information and conversion information (that is, mask information) that are corresponding to a column of data that needs to be read, that is, find a standard column to which the column of data that needs to be read belongs; find, from the standard-column management table, all section start information corresponding to the standard column to which the column of data that needs to be read belongs; and then, read the corresponding data and return.

When the local device is a raw device, the disk management information table records that which logical cylinders store which data, and a sequence of storing the data. When starting, a system may read the disk management information table and management information of another database into a memory; find standard-column information and conversion information that are corresponding to a column of data that needs to be read; find, from the standard-column management table, all section start information corresponding to a standard column to which the column of data that needs to be read belongs; and then, read the corresponding data and return.

It may be understood that when the local device includes a multi-platter system, the local device may directly acquire a marked start position of a section of each standard column and recorded conversion information; find, with reference to the standard-column management table, all section start information corresponding to a standard column to which a column of data that needs to be read belongs; and then, read the corresponding data and return.

Figure 7:
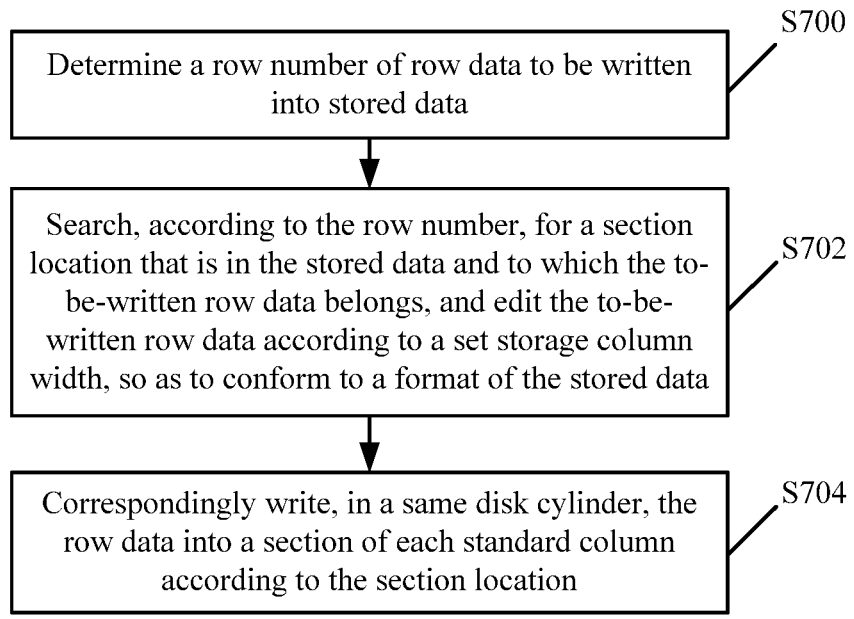
FIG. 7 is a schematic flowchart of a data writing method according to an embodiment of the present disclosure.

To better implement the foregoing solutions of this embodiment of the present disclosure, with reference to a schematic flowchart, shown in FIG. 7, of a data writing method according to an embodiment of the present disclosure, the following describes an implementation manner of the data writing method corresponding to the foregoing data processing method, including the following steps.

Step S700: Determine a row number of row data to be written into stored data.

The stored data is stored using the embodiment of the foregoing data processing method.

Step S702: Search, according to the row number, for a section location that is in the stored data and to which the to-be-written row data belongs, and edit the to-be-written row data according to a set storage column width, so as to conform to a format of the stored data.

A database column information table or a disk management information table may be searched, according to the row number, for a section that is in the stored data and to which the to-be-written row data belongs, and start information corresponding to a found section is acquired from a standard-column management table; then, the to-be-written row data is edited according to the set storage column width, so as to conform to the format of the stored data.

Step S704: Correspondingly write, in a same disk cylinder, the row data into a section of each standard column according to the section location.

When a local device is a file system, the local device may calculate, according to the row number and information in the database column information table, the section that is in the stored data and to which the to-be-written row data belongs; acquire the start information corresponding to a found section from the standard-column management table; edit the to-be-written row data according to the set storage column width, so as to conform to the format of the stored data; calculate an offset location of a row in the section into which the row data is to be written; and then, correspondingly write the row data into a section of each standard column.

When the local device is a raw device, the local device may calculate, according to the row number and information in the disk management information table, the section that is in the stored data and to which the to-be-written row data belongs; acquire the start information corresponding to a found section from the standard-column management table; edit the to-be-written row data according to the set storage column width, so as to conform to the format of the stored data; calculate an offset location of a row in the section into which the row data is to be written; and then, correspondingly write the row data into a section of each standard column.

When the local device includes a multi-platter system, the local device may mark, by means of hardware, start positions of different platters of a same physical cylinder, where the start positions of all the platters are aligned with each other on the same physical cylinder; search, according to the start positions and the row number, for a start position of a section that is in the stored data and to which the to-be-written row data belongs, that is, directly acquire a marked start position of a section of each standard column; calculate, according to the row number, the section that is in the stored data and to which the to-be-written row data belongs; acquire the start information corresponding to a found section from the standard-column management table; edit the to-be-written row data according to the set storage column width, so as to conform to the format of the stored data; calculate an offset location of a row in the section to which the row data is to be written; and then, correspondingly write the row data into a section of each standard column.

During implementation of this embodiment of the present disclosure, same-row data of the to-be-stored data is stored in a same disk cylinder, and in the disk cylinder, data in each section of columns is successively stored. A magnetic disk can complete row writing by rotating for addressing only once, and write performance is close to that of sequential write, which resolves the technical problem of a slow write speed during columnar database running in the prior art, and greatly improves write efficiency of a columnar database. In addition, hardware marking may further be used, so that standard columns are aligned with each other among platters. Then, when data in a same row but different columns needs to be read or written, parallel reading or writing may be directly performed because all heads are aligned with each other in physical locations. In addition, data in each column still remains continuous on a same platter, and efficiency in reading or writing a column of data is still equivalent to that of sequential read.

Figure 8:
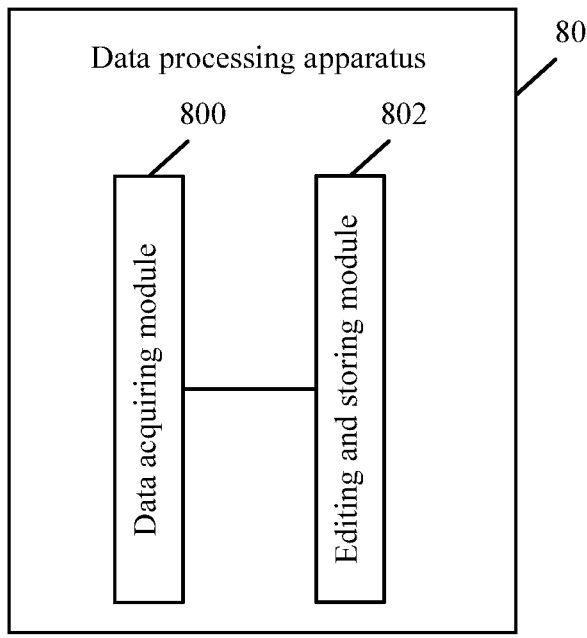
FIG. 8 is a schematic structural diagram of a data processing apparatus according to an embodiment of the present disclosure.

To better implement the foregoing solutions of the embodiment of the present disclosure, with reference to a schematic structural diagram, shown in FIG. 8, of a data processing apparatus according to an embodiment of the present disclosure, the following describes an implementation manner of the apparatus corresponding to the foregoing method. A data processing apparatus 80 includes a data acquiring module 800 and an editing and storing module 802.

The data acquiring module 800 is configured to acquire to-be-stored data in a data table in a columnar database; and the editing and storing module 802 is configured to divide and/or combine the to-be-stored data according to space of an allocated disk cylinder; and store same-row data of the to-be-stored data in a same disk cylinder, and in the disk cylinder, successively store data in each section of columns.

Figure 9:
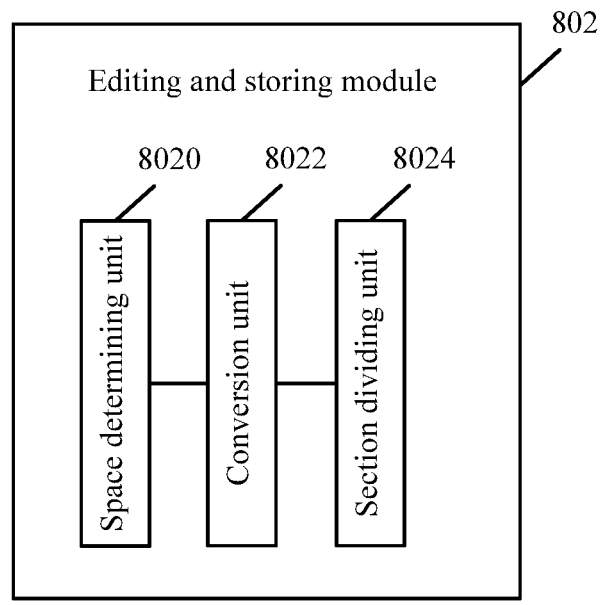
FIG. 9 is a schematic structural diagram of a first embodiment of an editing and storing module according to the present disclosure.

Further, as shown in a schematic structural diagram, shown in FIG. 9, of a first embodiment of the editing and storing module according to the present disclosure, the editing and storing module 802 includes a space determining unit 8020, a conversion unit 8022, and a section dividing unit 8024.

The space determining unit 8020 is configured to determine, according to a set storage column width and a column attribute of the to-be-stored data, continuous space of a disk cylinder that needs to be allocated; the conversion unit 8022 is configured to divide and/or combine all columns of the to-be-stored data according to the storage column width to convert all the columns into at least one standard column, and record conversion information, where a column width of the standard column is the storage column width; and the section dividing unit 8024 is configured to divide, according to the continuous space of the allocated disk cylinder and a set section storage size, each standard column obtained after conversion into at least one section, where a size of each section obtained by means of division is the set section storage size.

Figure 10:
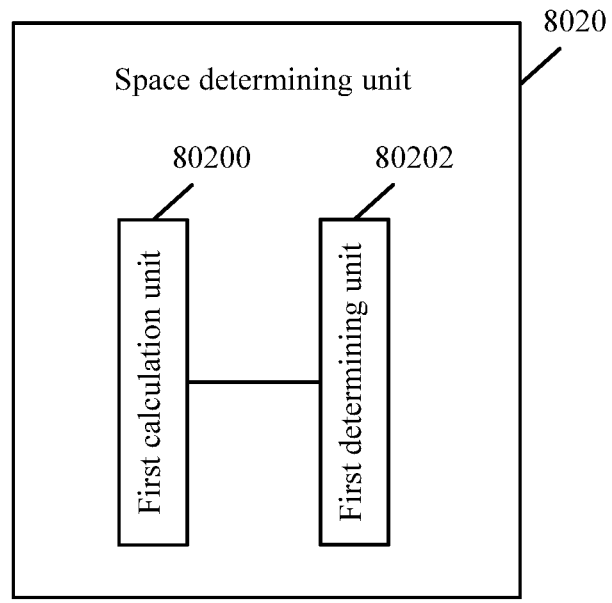
FIG. 10 is a schematic structural diagram of a space determining unit according to an embodiment of the present disclosure.

Further, as shown in a schematic structural diagram, shown in FIG. 10, of the space determining unit according to an embodiment of the present disclosure, the space determining unit 8020 includes a first calculation unit 80200 and a first determining unit 80202.

The first calculation unit 80200 is configured to calculate a quantity of required standard columns according to the set storage column width and the column attribute of the to-be-stored data; and the first determining unit 80202 is configured to determine, according to the calculated quantity of required standard columns and the set section storage size, the continuous space of the disk cylinder that needs to be allocated.

Figure 11:
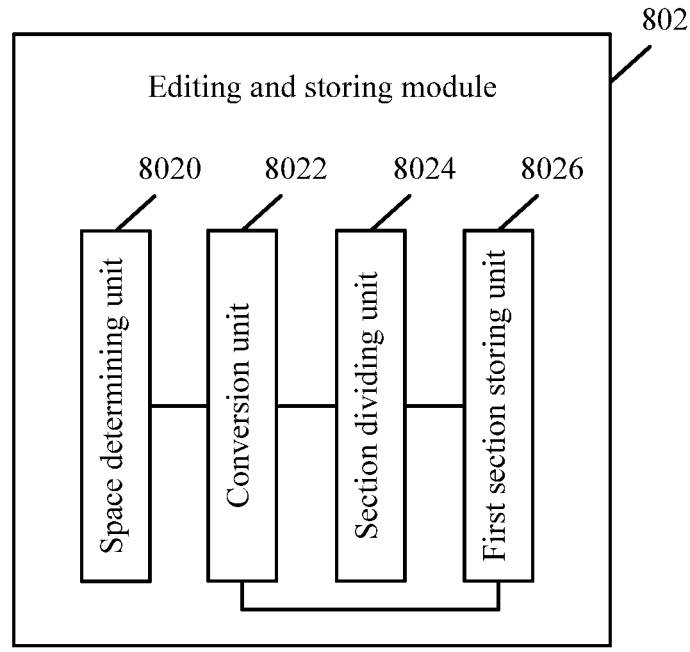
FIG. 11 is a schematic structural diagram of a second embodiment of an editing and storing module according to the present disclosure.

Further, as shown in a schematic structural diagram, shown in FIG. 11, of a second embodiment of the editing and storing module according to the present disclosure, in addition to the space determining unit 8020, the conversion unit 8022, and the section dividing unit 8024, the editing and storing module 802 may further include a first section storing unit 8026 configured to successively store, according to a column sequence of all the standard columns obtained after conversion, one section of each standard column in the allocated disk cylinder, where data of each section is successively stored in sequence, and all data sections in a same disk cylinder have a same data row quantity.

When each standard column is divided into at least two sections, the first section storing unit 8026 is configured to, according to the column sequence of all the standard columns obtained after conversion, successively store one section of each standard column in the allocated disk cylinder, then successively store a next section of each standard column in the allocated disk cylinder, where data of each section is successively stored in sequence, and all data sections of a same disk cylinder have a same data row quantity.

Figure 12:
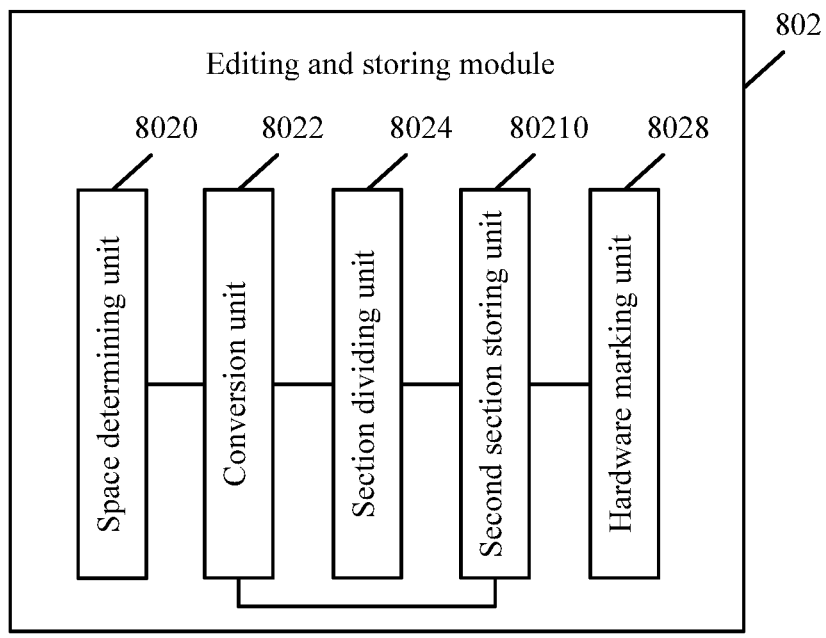
FIG. 12 is a schematic structural diagram of a third embodiment of an editing and storing module according to the present disclosure.

Further, as shown in a schematic structural diagram, shown in FIG. 12, of a third embodiment of the editing and storing module according to the present disclosure, when the data processing apparatus 80 includes at least two platters, in addition to the space determining unit 8020, the conversion unit 8022, and the section dividing unit 8024, the editing and storing module 802 may further include a hardware marking unit 8028 and a second section storing unit 80210.

The hardware marking unit 8028 is configured to mark, by means of hardware, start positions of different platters that constitute a same physical cylinder, where the start positions of all the platters are aligned with each other on the same physical cylinder; and the second section storing unit 80210 is configured to simultaneously store, starting from the start positions, sections of all the standard columns obtained after conversion in all the platters of the same physical cylinder, where data of each section is successively stored in sequence, and all data sections have a same data row quantity.

It should be noted that when the data processing apparatus 80 is a raw device, the disk cylinder is at least one continuous logical cylinder; or when the data processing apparatus 80 includes at least two platters, the disk cylinder is a physical cylinder constituted by the at least two platters.

Still further, the data processing apparatus 80 may further include a standard-column management table generating module configured to generate a standard-column management table, used to store set storage column width information, section information corresponding to each standard column, and start position information of each section.

Still further, the data processing apparatus 80 may further include a start information acquiring module 130 and a data reading module, where the start information acquiring module is configured to acquire section start information and conversion information that are corresponding to to-be-read data; and the data reading module is configured to read the corresponding data according to the section start information and using the conversion information.

Figure 13:
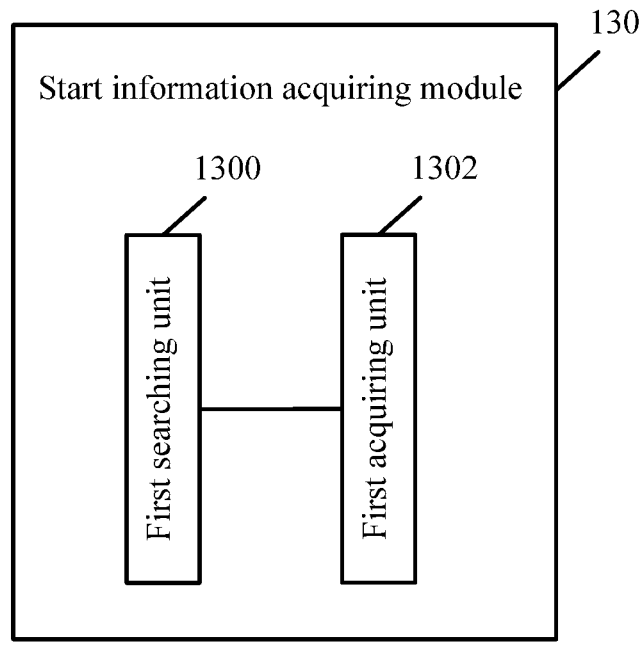
FIG. 13 is a schematic structural diagram of a start information acquiring module according to an embodiment of the present disclosure.

Still further, as shown in a schematic structural diagram, shown in FIG. 13, of the start information acquiring module according to an embodiment of the present disclosure, the start information acquiring module 130 includes a first searching unit 1300 and a first acquiring unit 1302.

The first searching unit 1300 is configured to search a database column information table or a disk management information table for standard-column information and the conversion information that are corresponding to the to-be-read data; and the first acquiring unit 1302 is configured to acquire all section start information corresponding to a found standard column from the standard-column management table.

It may be understood that a function of each function module in the data processing apparatus 80 may be implemented according to the method in the foregoing method embodiment; details are not described herein again.

Figure 14:
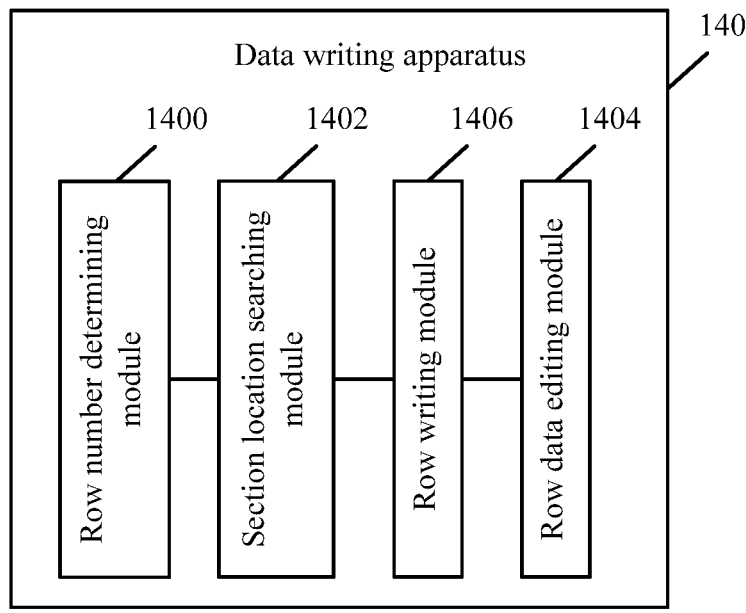
FIG. 14 is a schematic structural diagram of a data writing apparatus according to an embodiment of the present disclosure.

To better implement the foregoing solutions of the embodiment of the present disclosure, with reference to a schematic structural diagram, shown in FIG. 14, of a data writing apparatus according to an embodiment of the present disclosure, the following describes an implementation manner of the apparatus corresponding to the foregoing method. A data writing apparatus 140 includes a row number determining module 1400, a section location searching module 1402, a row data editing module 1404, and a row writing module 1406.

The row number determining module 1400 is configured to determine a row number of row data to be written into stored data, where the stored data is stored using the foregoing data processing apparatus 80; the section location searching module 1402 is configured to search, according to the row number, for a section location that is in the stored data and to which the to-be-written row data belongs; the row data editing module 1404 is configured to edit the to-be-written row data according to a set storage column width, so as to conform to a format of the stored data; and the row writing module 1406 is configured to correspondingly write, in a same disk cylinder, the row data into a section of each standard column according to the section location.

Figure 15:
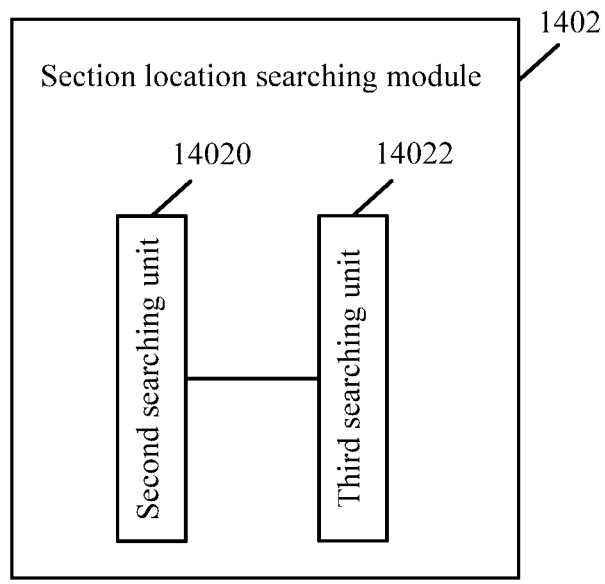
FIG. 15 is a schematic structural diagram of a first embodiment of a section location searching module according to the present disclosure.

Further, as shown in a schematic structural diagram, shown in FIG. 15, of a first embodiment of the section location searching module according to the present disclosure, the section location searching module 1402 includes a second searching unit 14020 and a third searching unit 14022.

The second searching unit 14020 is configured to search, according to the row number, a database column information table or a disk management information table for a section that is in the stored data and to which the to-be-written row data belongs; and the third searching unit 14022 is configured to acquire start information corresponding to a found section from a standard-column management table.

Figure 16:
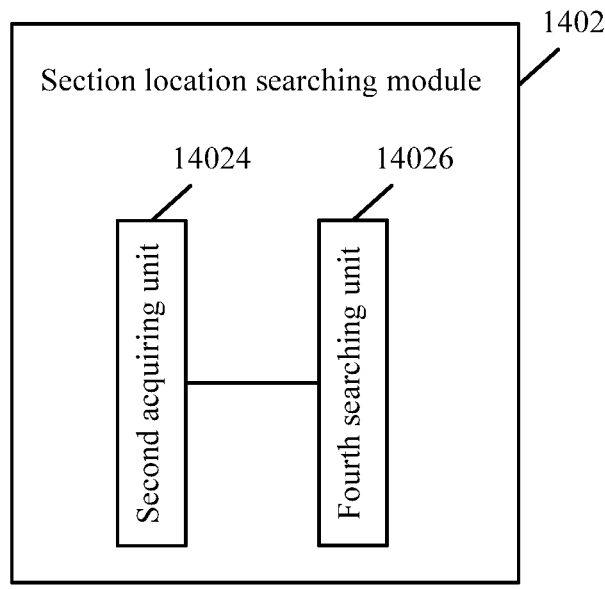
FIG. 16 is a schematic structural diagram of a second embodiment of a section location searching module according to the present disclosure.

Still further, when the data writing apparatus 140 includes at least two platters, as shown in a schematic structural diagram, shown in FIG. 16, of a second embodiment of the section location searching module according to the present disclosure, the section location searching module 1402 includes a second acquiring unit 14024 and a fourth searching unit 14026.

The second acquiring unit 14024 is configured to acquire start positions, that are marked by means of hardware, of different platters that constitute a same physical cylinder, where the start positions of all the platters are aligned with each other on the same physical cylinder; and the fourth searching unit 14026 is configured to search, according to the start positions and the row number, for a start position of a section that is in the stored data and to which the to-be-written row data belongs.

It may be understood that a function of each function module in the data writing apparatus 140 may be implemented according to the method in the foregoing method embodiment; details are not described herein again.

To better implement the foregoing solutions of the embodiment of the present disclosure, the present disclosure further provides a related device configured to cooperate to implement the foregoing solutions. With reference to a schematic structural diagram, shown in FIG. 17, of a first embodiment of an electronic device according to the present disclosure, the following provides detailed description.

Figure 17:
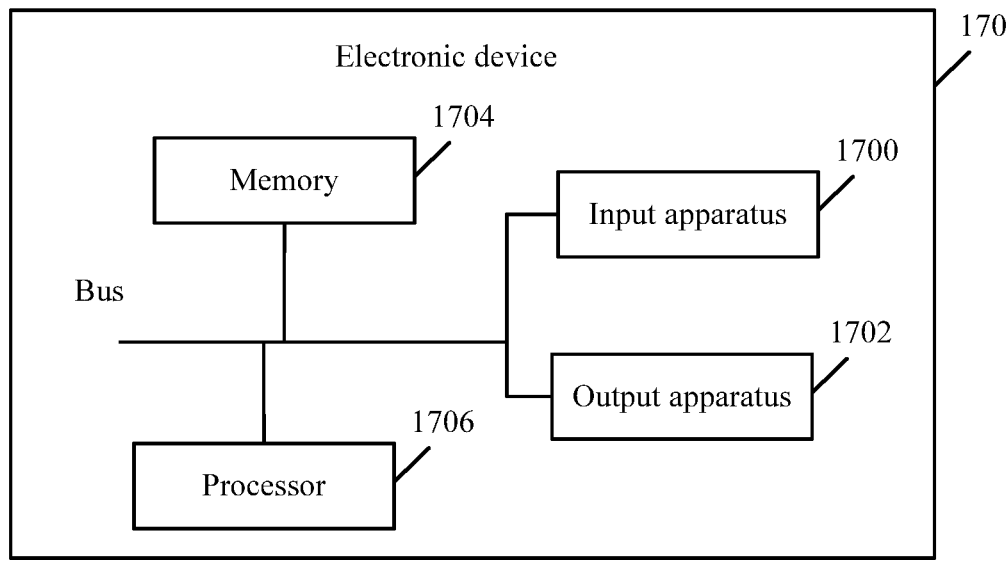
FIG. 17 is a schematic structural diagram of a first embodiment of an electronic device according to the present disclosure.

An electronic device 170 includes an input apparatus 1700, an output apparatus 1702, a memory 1704, and a processor 1706 (a quantity of processors 1706 in an electronic device may be one or more, and one processor is used as an example in FIG. 17). In some embodiments of the present disclosure, the input apparatus 1700, the output apparatus 1702, the memory 1704, and the processor 1706 may be connected using a bus or in another manner. That they are connected using a bus is used as an example in FIG. 17.

The processor 1706 executes the following steps: acquire to-be-stored data in a data table in a columnar database; divide and/or combine the to-be-stored data according to space of an allocated disk cylinder; and store same-row data of the to-be-stored data in a same disk cylinder, and in the disk cylinder, successively store data in each section of columns.

Further, that the processor 1706 divides and/or combines the to-be-stored data according to the space of the allocated disk cylinder includes determining, according to a set storage column width and a column attribute of the to-be-stored data, continuous space of a disk cylinder that needs to be allocated; dividing and/or combining all columns of the to-be-stored data according to the storage column width to convert all the columns into at least one standard column, and recording conversion information, where a column width of the standard column is the storage column width; and dividing, according to the continuous space of the allocated disk cylinder and a set section storage size, each standard column obtained after conversion into at least one section, where a size of each section obtained by means of division is the set section storage size.

Still further, that the processor 1706 determines, according to the set storage column width and the column attribute of the to-be-stored data, the continuous space of the disk cylinder that needs to be allocated includes calculating a quantity of required standard columns according to the set storage column width and the column attribute of the to-be-stored data; and determining, according to the calculated quantity of required standard columns and the set section storage size, the continuous space of the disk cylinder that needs to be allocated.

Still further, that the processor 1706 stores the same-row data of the to-be-stored data in the same disk cylinder, and in the disk cylinder, successively stores the data in each section of columns includes successively storing, according to a column sequence of all the standard columns obtained after conversion, one section of each standard column in the allocated disk cylinder, where data of each section is successively stored in sequence, and all data sections in a same disk cylinder have a same data row quantity.

Still further, when the electronic device 170 includes at least two platters, that the processor 1706 stores the same-row data of the to-be-stored data in the same disk cylinder, and in the disk cylinder, successively stores the data in each section of columns includes marking, by means of hardware, start positions of different platters that constitute a same physical cylinder, where the start positions of all the platters are aligned with each other on the same physical cylinder; and simultaneously storing, starting from the start positions, sections of all the standard columns obtained after conversion in all the platters of the same physical cylinder, where data of each section is successively stored in sequence, and all data sections have a same data row quantity.

Still further, when each standard column is divided into at least two sections, that the processor 1706 successively stores, according to the column sequence of all the standard columns obtained after conversion, one section of each standard column in the allocated disk cylinder includes, according to the column sequence of all the standard columns obtained after conversion, successively storing one section of each standard column in the allocated disk cylinder, and then successively storing a next section of each standard column in the allocated disk cylinder.

Still further, the processor 1706 further executes generating a standard-column management table, used to store set storage column width information, section information corresponding to each standard column, and start position information of each section.

Still further, the processor 1706 further executes the following steps: acquire section start information and conversion information that are corresponding to to-be-read data; and read the corresponding data according to the section start information and using the conversion information.

Still further, that the processor 1706 acquires the section start information and the conversion information that are corresponding to the to-be-read data includes searching a database column information table or a disk management information table for standard-column information and the conversion information that are corresponding to the to-be-read data; and acquiring all section start information corresponding to a found standard column from the standard-column management table.

The electronic device 170 in this embodiment of the present disclosure includes but is not limited to an electronic device, such as a computer or a data warehouse storage all-in-one machine.

It may be understood that a function of each function module in the electronic device 170 may be implemented according to the method in the foregoing method embodiment; details are not described herein again.

As shown in a schematic structural diagram, shown in FIG. 18, of a second embodiment of an electronic device according to the present disclosure, detailed description is as follows.

Figure 18:
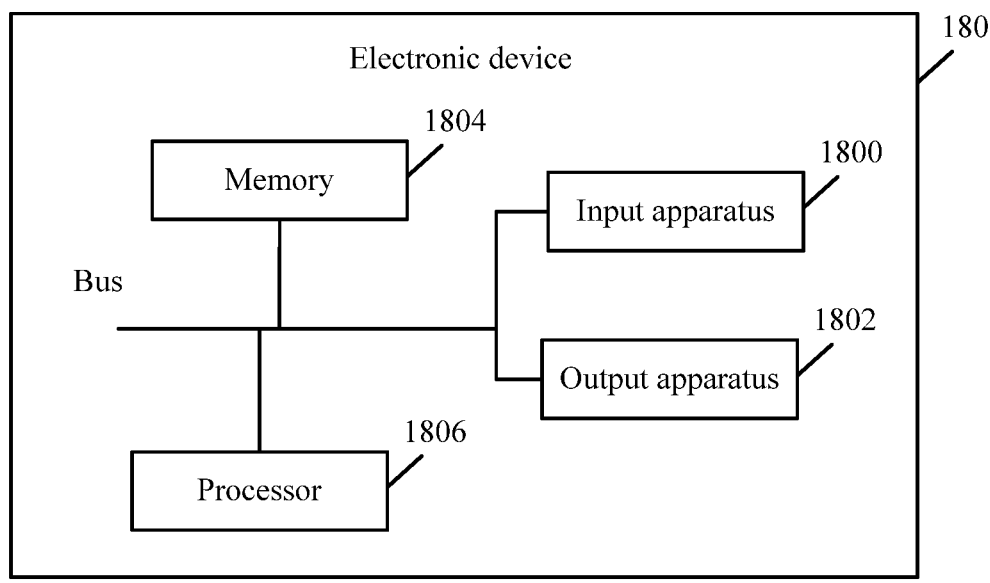
FIG. 18 is a schematic structural diagram of a second embodiment of an electronic device according to the present disclosure.

An electronic device 180 includes an input apparatus 1800, an output apparatus 1802, a memory 1804, and a processor 1806 (a quantity of processors 1806 in an electronic device may be one or more, and one processor is used as an example in FIG. 18). In some embodiments of the present disclosure, the input apparatus 1800, the output apparatus 1802, the memory 1804, and the processor 1806 may be connected using a bus or in another manner. That they are connected using a bus is used as an example in FIG. 18.

The processor 1806 executes the following steps: determine a row number of row data to be written into stored data; where the stored data is stored using the data processing method according to the embodiment of the present disclosure; search, according to the row number, for a section location that is in the stored data and to which the to-be-written row data belongs, and edit the to-be-written row data according to a set storage column width, so as to conform to a format of the stored data; and correspondingly write, in a same disk cylinder, the row data into a section of each standard column according to the section location.

Still further, that the processor 1806 searches, according to the row number, for the section location that is in the stored data and to which the to-be-written row data belongs includes searching, according to the row number, a database column information table or a disk management information table for a section that is in the stored data and to which the to-be-written row data belongs; and acquiring start information corresponding to a found section from a standard-column management table.

Still further, when the electronic device 180 includes at least two platters, that the processor 1806 searches, according to the row number, for the section location that is in the stored data and to which the to-be-written row data belongs includes acquiring start positions, that are marked by means of hardware, of different platters that constitute a same physical cylinder, where the start positions of all the platters are aligned with each other on the same physical cylinder; and searching, according to the start positions and the row number, for a start position of a section that is in the stored data and to which the to-be-written row data belongs.

The electronic device 180 in this embodiment of the present disclosure includes but is not limited to an electronic device, such as a computer or a data warehouse storage all-in-one machine.

It may be understood that a function of each function module in the electronic device 180 may be implemented according to the method in the foregoing method embodiment; details are not described herein again.

In conclusion, during implementation of the embodiments of the present disclosure, same-row data of the to-be-stored data is stored in a same disk cylinder, and in the disk cylinder, data in each section of columns is successively stored. A magnetic disk can complete row writing by rotating for addressing only once, and write performance is close to that of sequential write, which resolves the technical problem of a slow write speed during columnar database running in the prior art, and greatly improves write efficiency of a columnar database. In addition, hardware marking may further be used, so that standard columns are aligned with each other among platters. Then, when data in a same row but different columns needs to be read or written, parallel reading or writing may be directly performed because all heads are aligned with each other in physical locations. In addition, data in each column still remains continuous on a same platter, and efficiency in reading or writing a column of data is still equivalent to that of sequential read.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include a magnetic disk, an optical disc, a read-only memory (ROM), a random access memory (RAM), or the like.

What is disclosed above is merely exemplary embodiments of the present disclosure, and certainly is not intended to limit the protection scope of the present disclosure. A person of ordinary skill in the art may understand that all or some of processes that implement the foregoing embodiments and equivalent modifications made in accordance with the claims of the present disclosure shall fall within the scope of the present disclosure.

What is claimed is:

1. A data processing method, comprising:
    acquiring to-be-stored data in a data table in a columnar database;
    determining, according to a set storage column width and width information of the to-be-stored data, continuous space of an allocated disk cylinder that needs to be allocated;
    editing all columns of the to-be-stored data according to the storage column width to convert all the columns into at least one standard column, and recording conversion information, wherein a column width of the standard column is the storage column width;
    dividing, according to the continuous space of the allocated disk cylinder and a set section storage size, each standard column obtained after conversion into at least one section, wherein a size of each section obtained by means of division is the set section storage size; and
    storing same-row data of the to-be-stored data in a same disk cylinder, wherein data in each section of columns is successively stored in the allocated disk cylinder.

2. The method according to claim 1, wherein determining, according to the set storage column width and width information of the to-be-stored data, continuous space of the allocated disk cylinder that needs to be allocated comprises:
    calculating a quantity of required standard columns according to the set storage column width and the width information of the to-be-stored data; and
    determining, according to the calculated quantity of required standard columns and the set section storage size, the continuous space of the allocated disk cylinder that needs to be allocated.

3. The method according to claim 1, wherein storing the same-row data of the to-be-stored data in the same disk cylinder, comprises successively storing, according to a column sequence of all the standard columns obtained after conversion, one section of each standard column in the allocated disk cylinder, wherein data of each section is successively stored in sequence, and wherein all data sections in a same disk cylinder have a same data row quantity.

4. The method according to claim 1, wherein when a local device comprises at least two platters, storing the same-row data of the to-be-stored data in the same disk cylinder comprises:
    marking, by means of hardware, start positions of different platters that constitute a same physical cylinder, wherein start positions of all the platters are aligned with each other on the same physical cylinder; and
    simultaneously storing, starting from the start positions, sections of all the standard columns obtained after conversion in all the platters of the same physical cylinder, wherein data of each section is successively stored in sequence, and wherein all data sections have a same data row quantity.

5. The method according to claim 3, wherein when each standard column is divided into at least two sections, successively storing, according to the column sequence of all the standard columns obtained after conversion, one section of each standard column in the allocated disk cylinder comprises:
    successively storing one section of each standard column in the allocated disk cylinder according to the column sequence of all the standard columns obtained after conversion; and
    successively storing a next section of each standard column in the allocated disk cylinder.

6. The method according to claim 4, wherein when the local device is a raw device, the allocated disk cylinder is at least one continuous logical cylinder.

7. The method according to claim 4, wherein when the local device comprises at least two platters, the allocated disk cylinder is a physical cylinder constituted by the at least two platters.

8. The method according to claim 1, further comprising generating a standard-column management table used to store the set storage column width information, section information corresponding to each standard column, and start position information of each section.

9. The method according to claim 8, further comprising:
    acquiring section start information and conversion information that are corresponding to to-be-read data; and
    reading the corresponding data according to the section start information using the conversion information.

10. The method according to claim 9, wherein acquiring the section start information and the conversion information that are corresponding to to-be-read data comprises:
    searching a database column information table or a disk management information table for standard-column information and the conversion information that are corresponding to the to-be-read data; and
    acquiring all section start information corresponding to a found standard column from the standard-column management table.

11. The method according to claim 10, further comprising:
  determining a row number of to-be-written row data to be written into stored data;
  searching, according to the row number, for a section location that is in the stored data and to which the to-be-written row data belongs;
  editing the to-be-written row data according to the set storage column width, so as to conform to a format of the stored data; and
  correspondingly writing, in a same disk cylinder, the row data into a section of each standard column according to the section location.

12. The method according to claim 11, wherein searching, according to the row number, for the section location that is in the stored data and to which the to-be-written row data belongs comprises:
  searching, according to the row number, the database column information table or the disk management information table for a section that is in the stored data and to which the to-be-written row data belongs; and
  acquiring start information corresponding to a found section from a standard-column management table.

13. The method according to claim 11, wherein when a local device comprises at least two platters, searching, according to the row number, for the section location that is in the stored data and to which the to-be-written row data belongs comprises:
  acquiring start positions, that are marked by means of hardware, of different platters that constitute a same physical cylinder, wherein the start positions of all the platters are aligned with each other on the same physical cylinder; and
  searching, according to the start positions and the row number, for a start position of a section that is in the stored data and to which the to-be-written row data belongs.

14. An electronic device, comprising:
  an input apparatus;
  an output apparatus;
  a memory having a plurality of instructions stored thereon; and
  a processor coupled to the input apparatus, the output apparatus, and the processor, wherein the processor executes the instructions and is configured to:
    acquire to-be-stored data in a data table in a columnar database;
    determine, according to a set storage column width and width information of the to-be-stored data, continuous space of an allocated disk cylinder that needs to be allocated;
    edit all columns of the to-be-stored data according to the storage column width to convert all the columns into at least one standard column, and record conversion information, wherein a column width of the standard column is the storage column width;
    divide according to the continuous space of the allocated disk cylinder and a set section storage size, each standard column obtained after conversion into at least one section wherein a size of each section obtained by means of division is the set section storage size; and
    store same-row data of the to-be-stored data in a same disk cylinder, wherein data in each section of columns is successively stored in the same disk cylinder.

15. The electronic device according to claim 14, wherein the instructions further cause the processor to:
  calculate a quantity of required standard columns according to the set storage column width and the width information of the to-be-stored data; and
  determine, according to the calculated quantity of required standard columns and the set section storage size, the continuous space of the same disk cylinder that needs to be allocated.

16. The electronic device according to claim 14, wherein the instructions further cause the processor to successively store, according to a column sequence of all the standard columns obtained after conversion, one section of each standard column in the allocated disk cylinder, wherein data of each section is successively stored in sequence, and wherein all data sections in the same disk cylinder have a same data row quantity.

17. The electronic device according to claim 14, wherein the instructions further cause the processor to:
  mark, by means of hardware, start positions of different platters that constitute a same physical cylinder, wherein start positions of each of the different platters are aligned with each other on the same physical cylinder; and
  simultaneously store, starting from the start positions, sections of all the standard columns obtained after conversion in each of the different platters of the same physical cylinder, wherein data of each section is successively stored in sequence, and wherein all data sections have a same data row quantity.

18. The electronic device according to claim 16, wherein when each standard column is divided into at least two sections, the instructions further cause the processor to:
  successively store one section of each standard column in the allocated disk cylinder according to the column sequence of all the standard columns obtained after conversion; and
  successively store a next section of each standard column in the allocated disk cylinder.

19. The electronic device according to claim 14, wherein when the electronic device is a raw device, the allocated disk cylinder is at least one continuous logical cylinder.

20. The electronic device according to claim 14, wherein when the electronic device comprises at least two platters, the allocated disk cylinder is a physical cylinder constituted by the at least two platters.

21. The electronic device according to claim 14, wherein the instructions further cause the processor to generate a standard-column management table used to store the set storage column width information, section information corresponding to each standard column, and start position information of each section.

22. The electronic device according to claim 21, wherein the instructions further cause the processor to:
  acquire section start information and conversion information that are corresponding to to-be-read data; and
  read the corresponding data according to the section start information and using the conversion information.

23. The electronic device according to claim 22, wherein the instructions further cause the processor to:
  search a database column information table or a disk management information table for standard-column information and the conversion information that are corresponding to the to-be-read data; and
  acquire all section start information corresponding to a found standard column from the standard-column management table.

24. The electronic device according to claim 23, wherein the instructions further cause the processor to:
  determine a row number of to-be-written row data to be written into stored data;
  search, according to the row number, for a section location that is in the stored data and to which the to-be-written row data belongs, and
  edit the to-be-written row data according to the set storage column width, so as to conform to a format of the stored data; and
  correspondingly write, in a same disk cylinder, the row data into a section of each standard column according to the section location.

25. The electronic device according to claim 24, wherein the instructions further cause the processor to:
  search, according to the row number, the database column information table or the disk management information table for a section that is in the stored data and to which the to-be-written row data belongs; and
  acquire start information corresponding to a found section from the standard-column management table.

26. The electronic device according to claim 24, wherein when the electronic device comprises at least two platters, the instructions further cause the processor to:
  acquire start positions, that are marked by means of hardware, of different platters that constitute a same physical cylinder, wherein the start positions of all the platters are aligned with each other on the same physical cylinder; and
  search, according to the start positions and the row number, for a start position of a section that is in the stored data and to which the to-be-written row data belongs.

* * * * *